UNITED STATES PATENT OFFICE.

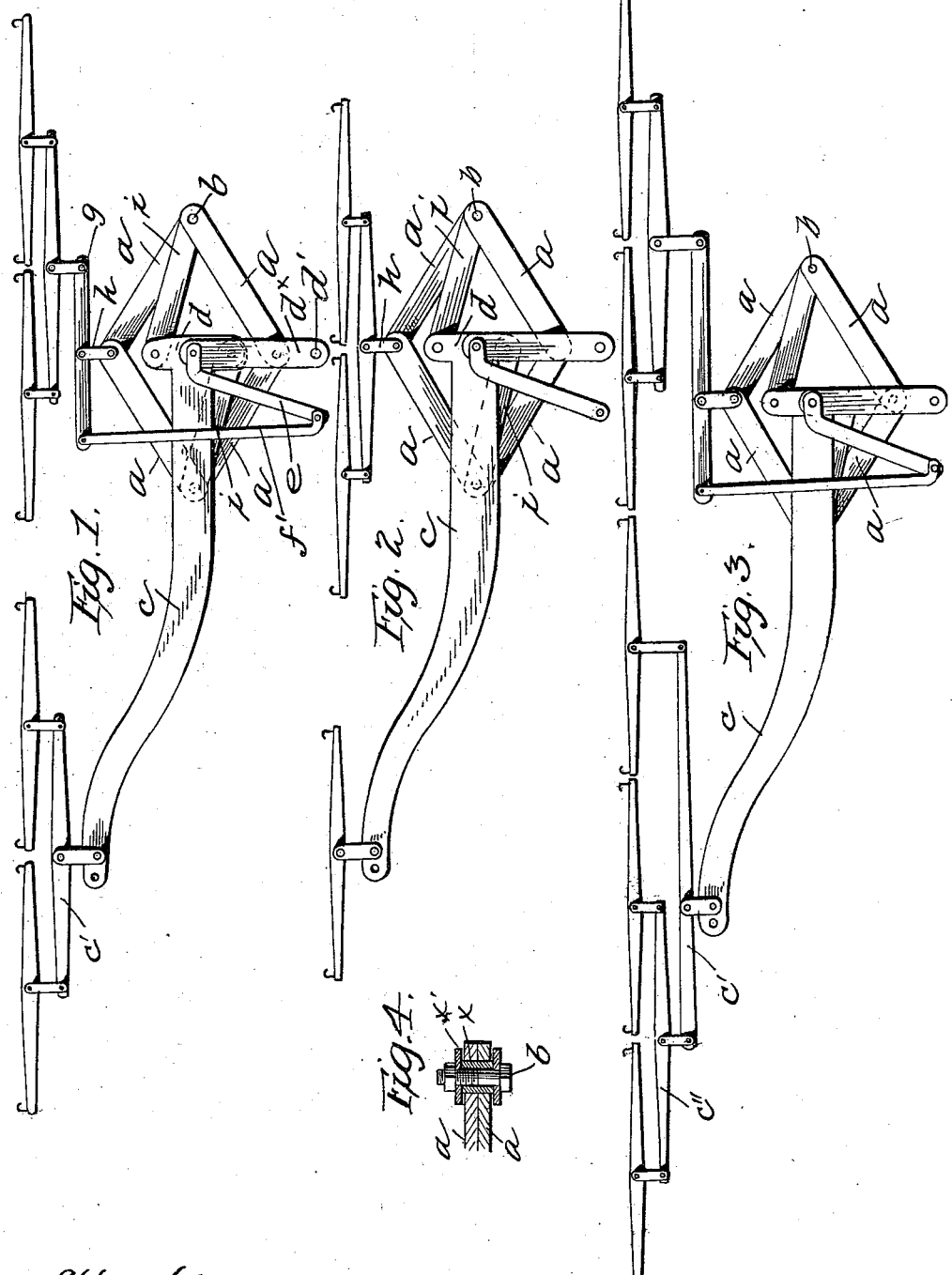

LUTHER J. SEVISON, OF FLORENCE, MICHIGAN.

DRAFT-EQUALIZER.

SPECIFICATION forming part of Letters Patent No. 555,622, dated March 3, 1896.

Application filed September 3, 1895. Serial No. 561,348. (No model.)

*To all whom it may concern:*

Be it known that I, LUTHER J. SEVISON, a citizen of the United States, residing at Florence, in the county of St. Joseph and State of Michigan, have invented certain new and useful Improvements in Draft - Equalizers, of which the following is a specification, reference being had therein to the accompanying drawings.

It is the object of my invention to provide a draft-equalizer that may be attached to a wagon, plow or the like and to which with immaterial modifications two or more horses may be attached and worked abreast with equal efficiency.

The invention includes a rectangular frame composed of sections pivotally connected to each other with means for attaching said frame to the load to be hauled.

It further includes the means for supporting the singletrees from the frame at different points, in order that a greater or less draft on one singletree will be equalized, as will be hereinafter described, and the load being hauled remain unaffected by said unequal pull.

The invention is illustrated in the accompanying drawings, in which—

Figure 1 is a plan of the device adapted to be drawn by four horses. Fig. 2 is a similar view showing but three singletrees. Fig. 3 is a like view showing five singletrees. Fig. 4 is a detail view of the joint.

In the drawings the rectangular frame is shown as comprising the flat bars $a$, pivotally connected to each other at their ends by the bolts $b$, which pass through bushings $x$, fitted to openings in said ends, and through washers $x'$ interposed between the faces of said bars and the heads and nuts carried by said bolts. One singletree or set of singletrees is supported from the free end of the lever $c$, which carries a cross-head $d$, through the center of which a bolt passes, on which are pivoted the draft-bars $d^\times$ and $e$. The draft-bars $d^\times$ are connected directly to the load at the point $d'$. The draft-bar $e$ is angularly shaped, its longer arm being connected to the outer arm of the angular bar $f'$, which together with said bar $e$ is adapted to be secured to the load at the pivotal point of said bars. The longer arm of the bar $f$ is pivotally connected to the laterally-extending bar $g$, which carries the opposite set of singletrees at its extreme end, being intermediately connected to one corner of the rectangular frame by the strap $h$. As will be seen from the drawings, reference being had to Fig. 2, but one singletree is supported from the bar $c$, while in Fig. 1 an extra bar $c'$ is interposed and two singletrees are supported, and in Fig. 3 still another bar $c''$ is inserted, and in this case three singletrees are supported from this end of the lever. As will be seen from Fig. 2, the bars $f$ and $g$ may be dispensed with and the singletree supported from the strap $h$ instead of from the end of the bar $g$. To the opposite ends of the cross-head $d$ the ends of the push-bars $i$ are pivotally connected, their opposite ends being pivotally connected to opposite corners of the rectangular frame, said bars extending substantially parallel to the lever $c$ and at right angles to the line of draft of the singletrees.

It will be clear from the foregoing description, taken in connection with the drawings, that if a stronger draft be exerted on the set of singletrees carried by the lever $c$ than on the other set of singletrees the end of said lever will be drawn forward and the head $d$ be tilted and thus force the push-bars outwardly and cause the frame to contract at right angles to the line of draft, thus drawing backwardly the singletree (and horse hitched thereto) supported from the frame through the strap $h$.

A reversal of the movement just described of the parts would of course take place if a greater pull be exerted on the set of singletrees supported from the frame through the strap $h$.

Having thus described my invention, what I claim is—

1. In a draft-equalizer and in combination a rectangular frame comprising the bars pivotally connected to each other, the lever carrying a set of singletrees, a second set of singletrees connected to said frame, and the means whereby said frame is contracted transversely of said lever when the outer end of said lever is swung forwardly, substantially as described.

2. In combination, the rectangular frame, comprising the sections pivotally connected to each other, the laterally-extending lever carrying one set of singletrees, the cross-head carried thereby, the draft-bar connected to said cross-head, the push-bars pivotally connected to opposite corners of said frame and the ends of said head, and the connection between the second set of singletrees and the frame at right angles to said lever, substantially as described.

3. In combination, the frame comprising the pivoted sections, the lever carrying the cross-head, the push-bars interposed between the ends of said head and said frame, the second set of singletrees and the pair of draft-bars pivoted on a common bolt secured in said head, the free ends thereof being adapted to be connected to the load at different points, substantially as described.

In testimony whereof I affix my signature in presence of two witnesses.

LUTHER J. SEVISON.

Witnesses:
ROBERT D. MERRITT,
J. FRED PUTNAM.